(12) United States Patent
Vrcelj et al.

(10) Patent No.: US 9,008,198 B2
(45) Date of Patent: Apr. 14, 2015

(54) METHODS AND APPARATUS FOR TIMING SYNCHRONIZATION BASED ON TRANSITIONAL PILOT SYMBOLS

(75) Inventors: Bojan Vrcelj, San Diego, CA (US); Krishna Kiran Mukkavilli, San Diego, CA (US); Ashok Mantravadi, San Diego, CA (US); Raghuraman Krishnamoorthi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1053 days.

(21) Appl. No.: 11/765,428

(22) Filed: Jun. 19, 2007

(65) Prior Publication Data

US 2008/0165908 A1 Jul. 10, 2008

Related U.S. Application Data

(60) Provisional application No. 60/883,703, filed on Jan. 5, 2007.

(51) Int. Cl.
*H04K 1/10* (2006.01)
*H04L 27/28* (2006.01)
(Continued)

(52) U.S. Cl.
CPC .......... *H04L 27/2662* (2013.01); *H04L 5/0048* (2013.01); *H04L 7/08* (2013.01); *H04L 25/0216* (2013.01); *H04L 25/023* (2013.01); *H04L 27/2613* (2013.01); *H04L 27/2675* (2013.01); *H04L 27/2695* (2013.01)

(58) Field of Classification Search
USPC ................. 375/260, 267, 316, 324
See application file for complete search history.

(56) References Cited

U.S. PATENT DOCUMENTS 7,327,800 B2    2/2008  Oprea et al.
7,508,842 B2 *  3/2009  Baum et al. ............ 370/468
(Continued)

FOREIGN PATENT DOCUMENTS

WO    2006099088         9/2006
WO    WO2006099240 A1    9/2006
(Continued)

OTHER PUBLICATIONS

International Search Report, PCT/US2008/050271, International Searching Authority, European Patent Office, Dec. 22, 2008.
(Continued)

*Primary Examiner* — Freshteh N Aghdam
(74) *Attorney, Agent, or Firm* — Norton Rose Fulbright US LLP

(57) ABSTRACT

Methods and apparatus for timing synchronization based on transitional pilot symbols. In an aspect, a method is provided for time tracking synchronization in an OFDM system. The method includes receiving at least one TDM pilot symbol comprising a plurality of modulated sub-carriers that are configured to provide a channel estimate having a length that extends up to a duration of an FFT used for data transmission. The method also includes determining one or both of an instantaneous and averaged channel estimates from the plurality of modulated sub-carriers, and calculating a timing offset based on one or both of the channel estimates. An apparatus includes a receiver configured to receive the at least one TDM pilot symbol, a channel estimator configured to determine the instantaneous and averaged channel estimates, and a time synchronizer configured to calculate a timing offset based on the channel estimates.

60 Claims, 9 Drawing Sheets

(51) Int. Cl.
*H04L 27/26* (2006.01)
*H04L 5/00* (2006.01)
*H04L 7/08* (2006.01)
*H04L 25/02* (2006.01)

(56) References Cited

U.S. PATENT DOCUMENTS

| | | |
|---|---|---|
| 2003/0218973 A1 | 11/2003 | Oprea et al. |
| 2006/0239367 A1 | 10/2006 | Wilhelmsson et al. |
| 2006/0245349 A1* | 11/2006 | Vrcelj et al. .................. 370/210 |
| 2006/0250937 A1* | 11/2006 | Wang et al. .................. 370/208 |
| 2006/0252420 A1 | 11/2006 | Mantravadi et al. |
| 2006/0256708 A1 | 11/2006 | Wang et al. |

FOREIGN PATENT DOCUMENTS

| | | |
|---|---|---|
| WO | WO2006099241 A1 | 9/2006 |
| WO | WO2006099242 | 9/2006 |

OTHER PUBLICATIONS

Written Opinion, PCT/US2008/050271, International Searching Authority, European Patent Office, Dec. 22, 2008.
Partial International Search Report—PCT/US2008/050271, International Searching Authority—European Patent Office—Sep. 26, 2008.

* cited by examiner

METHODS AND APPARATUS FOR TIMING SYNCHRONIZATION BASED ON TRANSITIONAL PILOT SYMBOLS

CLAIM OF PRIORITY UNDER 35 U.S.C. §119

The present Application for Patent claims priority to Provisional Application No. 60/883,703 entitled "METHODS AND APPARATUS FOR CHANNEL ESTIMATION IN A COMMUNICATION NETWORK" filed Jan. 5, 2007, and assigned to the assignee hereof and hereby expressly incorporated by reference herein.

BACKGROUND

1. Field

The present application relates generally to the transmission of information over a distribution network, and more particularly, to methods and apparatus for timing synchronization in a communication network based on transitional pilot symbols.

2. Background

Data networks, such as wireless communication networks, have to trade off between services customized for a single terminal and services provided to a large number of terminals. For example, the distribution of multimedia content to a large number of resource limited portable devices (subscribers) is a complicated problem. Therefore, it is very important for network administrators, content retailers, and service providers to have a way to distribute content and/or other network services in a fast and efficient manner and in such a way as to increase bandwidth utilization and power efficiency.

In current content delivery/media distribution systems, wide area and local area real time and non real time services are packed into a transmission frame and delivered to devices on a network. For example, a communication network may utilize Orthogonal Frequency Division Multiplexing (OFDM) to provide communications between a network server and one or more mobile devices. This technology provides a transmission frame that is packed with services to be delivered over a distribution network as a transmit waveform.

One problem associated with OFDM-based broadcast systems is that of time tracking synchronization. For example, timing synchronization in such systems is based on time-domain channel estimates. Typically, the length of the channel estimate used for data demodulation is shorter than twice the maximum expected delay spread. Using such channel estimates for time tracking synchronization may result in timing ambiguities due to the aliased nature of the time-domain channel estimate. As a result, the transmitted services may not be accurately decoded at receiving devices.

Therefore it would be desirable to have a system that operates to provide accurate time tracking synchronization that is more reliable and less prone to timing ambiguities.

SUMMARY

In one or more aspects, a timing synchronization system, comprising methods and apparatus, is provided that operates to allow accurate time tracking synchronization in a communication network.

In an aspect, a method is provided for time tracking synchronization in an OFDM system. The method comprises receiving at least one time division multiplexed (TDM) pilot symbol comprising a plurality of modulated sub-carriers that are configured to provide a channel estimate having a length that extends up to a duration of a Fast Fourier Transform (FFT) used for data transmission. The method also comprises determining an instantaneous channel estimate from the plurality of modulated sub-carriers, and calculating a timing offset based on the instantaneous channel estimate.

In another aspect, an apparatus is provided for time tracking synchronization in an OFDM system. The apparatus comprises a receiver configured to receive at least one TDM pilot symbol comprising a plurality of modulated sub-carriers that are configured to provide a channel estimate having a length that extends up to a duration of an FFT used for data transmission. The apparatus also comprises a channel estimator configured to determine an instantaneous channel estimate from the plurality of modulated sub-carriers, and a time synchronizer configured to calculate a timing offset based on the instantaneous channel estimate.

In another aspect, an apparatus is provided for time tracking synchronization in an OFDM system. The apparatus comprises means for receiving at least one TDM pilot symbol comprising a plurality of modulated sub-carriers that are configured to provide a channel estimate having a length that extends up to a duration of an FFT used for data transmission. The apparatus also comprises means for determining an instantaneous channel estimate from the plurality of modulated sub-carriers, and means for calculating a timing offset based on the instantaneous channel estimate.

In another aspect, a computer program product is provided for time tracking synchronization in an OFDM system. The computer program product comprises a computer-readable medium that comprises a first set of codes for causing a computer to receive at least one TDM pilot symbol comprising a plurality of modulated sub-carriers that are configured to provide a channel estimate having a length that extends up to a duration of an FFT used for data transmission. The computer-readable medium also comprises a second set of codes for causing the computer to determine an instantaneous channel estimate from the plurality of modulated sub-carriers, and a third set of codes for causing the computer to calculate a timing offset based on the instantaneous channel estimate.

In another aspect, at least one processor is provided that is configured to perform a method for time tracking synchronization in an OFDM system. The at least one processor comprises a first module for receiving at least one TDM pilot symbol comprising a plurality of modulated sub-carriers that are configured to provide a channel estimate having a length that extends up to a duration of an FFT used for data transmission. The at least one processor also comprises a second module for determining an instantaneous channel estimate from the plurality of modulated sub-carriers, and a third module for calculating a timing offset based on the instantaneous channel estimate.

Other aspects will become apparent after review of the hereinafter set forth Brief Description of the Drawings, Description, and the Claims.

BRIEF DESCRIPTION OF THE DRAWINGS

The foregoing aspects described herein will become more readily apparent by reference to the following description when taken in conjunction with the accompanying drawings wherein.

DESCRIPTION

In one or more aspects, a timing synchronization system is provided that operates to assist in data demodulation and provide accurate time tracking synchronization in a communication network. For the purpose of this description, aspects of the timing synchronization system are described herein with reference to a communication network utilizing OFDM to provide communications between network servers and one or more mobile devices. For example, in an aspect of an OFDM system, a server transmits a transmit waveform that comprises a transmission frame having multiplexed wide area and local data flows with a particular arrangement, sequence, interleaving, and/or other encoding of real-time and/or other than real-time data. The data is represented as symbols where each symbol comprises N sub-carriers.

As described below, the timing synchronization system is operable to assist in data demodulation and accurate time tracking synchronization so that receiving devices are able to accurately decode the wide and local area data flows. The system is well suited for use in wireless communication networks, but may be used in any type of wireless environment, including but not limited to, public networks, such as the Internet, private networks, such as virtual private networks (VPN), local area networks, wide area networks, long haul networks, or any other type of wireless network.

Wide Area and Local Area Data Distribution

Figure 1:
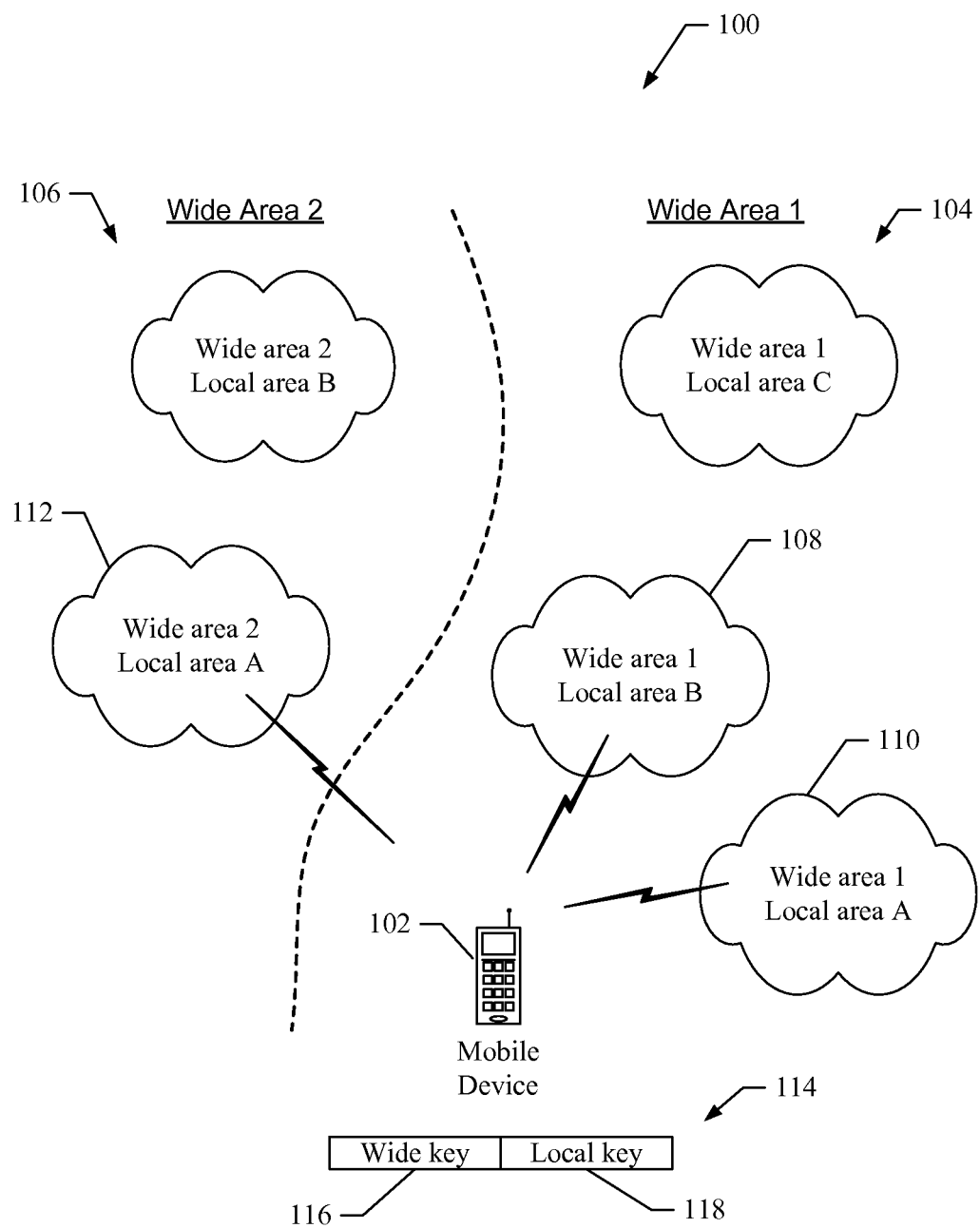
FIG. 1 shows a network that illustrates the distribution of wide area and local area data in an aspect of a content distribution system.

FIG. 1 shows a network 100 that illustrates the distribution of wide area and local area data in an aspect of a content distribution system. The network 100 comprises a first wide area 104 and a second wide area 106. For example, the first and second wide areas (104, 106) may be of the same or different sizes and cover a state, multiple states, or a country. Each of the wide areas (104, 106) includes local areas, for example local areas 108, 110, and 112, are included in the wide areas and each local area may cover a city, county, or other region.

The distribution system operates to deliver wide area and local area data over the wide and local areas, respectively. The system operates to distribute identical wide area data to all the local areas within a particular wide area. For example, identical wide area data is delivered by transmitters in the local areas 108 and 110. The devices in each of the local areas receive local area data that is particular to that local area. For example, the transmitters of the local area 108 operate to deliver wide area data associated with wide area 104, and local area data associated with the local area 108. Similarly, the transmitters of the local area 110 operate to deliver wide area data associated with wide area 104, and local area data associated with the local area 110.

In an aspect, the distribution system operates at each local area to combine the respective local data with the wide area data into a transmission frame that is transmitted to devices in the local area. The transmission frame is partitioned so that the wide area data is placed in a first partition and the local area data is placed in a second partition; however, other allocations are possible.

In order to deliver the data to selected devices, the wide area data and the local area data are scrambled or encrypted using one or more keys. Thus, a device wishing to receive particular wide or local area data needs to have the appropriate keys with which to descramble or decrypt the data. For example, the device 102 is able to receive transmission frames from transmitters operating in the local areas 108, 110, and 112. The decryption keys used by the device 102 determine which data the device 102 will be able to recover. For example, transmissions for which the device 102 has a key can be decoded, while transmissions for which the device 102 has no key will act as interference. Typically, decryption keys are distributed to devices during network registration.

The device 102 has decryption keys 114 which comprise a wide area key 116 and a local area key 118. The device uses these keys to decrypt received transmission frames in order to obtain selected wide and local area data. It will be assumed that the keys 114 are designed to decrypt data associated with the wide area 104 and the local area 110. For example, the device 102 may receive transmission frames from transmitters in the local areas 108, 110 and 112. The wide area key 116 allows the device to decrypt data associated with the wide area 104 that it receives from transmitters associated with the local areas 108 and 110. However, the local area key 118 restricts the device to decrypting data only from transmissions associated with the local area 110, and as a result, transmissions received that are associated with the local area 108 act as interference. Thus, the decryption keys 114 provided to the device 102 operate to allow the system to control what wide and local area data the device 102 is able to receive and decode.

Network Planning and Timing Ambiguities

To facilitate the distribution of data over a geographic region, network planning is performed to determine the distribution of transmitters over the region. In an aspect, transmitters are located in the region so that a receiving device can receive symbols of a transmission frame from one or more transmitters. Additionally, the transmitters are located so that the symbols can be received within an expected (or predetermined) delay spread (DS).

For the purposes of data demodulation and timing synchronization, a receiving device determines a channel estimate (CE) that describes the transmission channel over which a symbol is received. In an aspect, channel estimates are determined from "pilot observations" in received symbols of the transmission frame. For example, a portion of the sub-carriers of a data symbol are modulated with known pilot information to form frequency division multiplex (FDM) pilots. At the receiver, pilot observations at these sub-carriers are used to determine a CE. The length of the CE is determined from the number of distinct pilot observations in the symbol. However, in a data symbol, the number of sub-carriers used for pilots is relatively small so that the remaining sub-carriers of the symbol can be used for data transmission. This limits the length of channel estimates derived from data symbols.

Timing ambiguities may occur if the length of the CE is less than twice the length of the maximum expected DS. For example, if the CE is not long enough relative to the DS, it may become ambiguous as to when the start of a symbol is received. Because the number of sub-carriers used for pilots in a data symbol is relatively small, the length of channel estimates based on these pilot observations may be short so that such timing ambiguities result. However, aspects of the timing synchronization system operate to provide channel estimates having lengths that are greater than twice the maximum expected DS so that timing ambiguities can be eliminated.

Referring again to FIG. 1, the device 102 operates to determine one or more channel estimates. However, channel estimates associated with the wide area data may be significantly different than channel estimates associated with the local area data. For example, assuming the device 102 has the keys to decrypt local area data transmitted from the local area 110, a channel estimate associated with this local area data is determined only from symbols received from those transmissions. However, with respect to the wide area data, symbols received from transmitters associated with the local areas 108 and 110 are identical, and so they can be combined to produce channel estimates associated with the wide area data that may be different from the channel estimate associated with the local area data. Thus, in order for the device to receive and accurately decode the wide and local data, the device 102 may need to determine channel estimates for the wide and local area data and corresponding timing synchronization.

Figure 2:
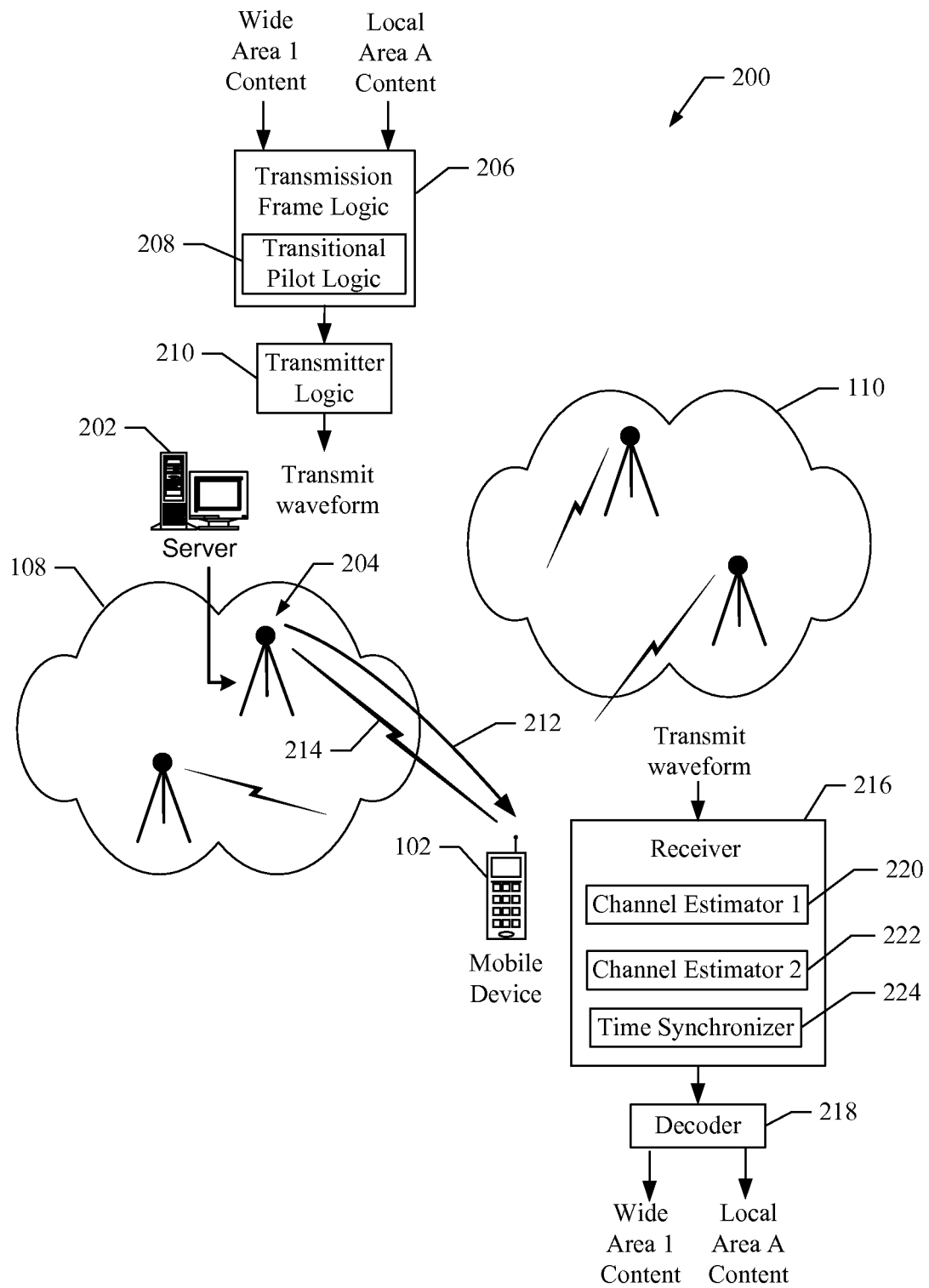
FIG. 2 shows a network that illustrates an aspect of a timing synchronization system.

FIG. 2 shows a network 200 that illustrates an aspect of a timing synchronization system. For example, the network 200 is part of the network 100 shown in FIG. 1. The network 200 comprises the mobile device 102, the local network 108 and the local network 110 that are illustrated in FIG. 1. For the purpose of this description, it will be assumed that the networks 108 and 110 operate to provide communications between one or more servers and one or more mobile devices using OFDM technology. For example, the networks 108 and 110 each may provide services to devices within a local area such as a neighborhood, local community, city or county.

It should be noted that the networks 108 and 110 may communicate with any number and/or types of portable devices within the scope of the aspects. For example, other devices suitable for use in aspects of the timing synchronization system include, but are not limited to, a personal digital assistant (PDA), email device, pager, a notebook computer, mp3 player, video player, or a desktop computer.

In an aspect, a server 202 operates to provide services that may be subscribed to by devices in communication with the network 108. For example, the server 202 is coupled to the network 108, which comprises one or more transmitters to transmit information between the server 202 and devices in communication with the network 108. For example, transmitter 204 operates to transmit information from the server 202 to the device 102.

The server 202 comprises (or obtains) local area A data and wide area 1 data that includes real time and non real time services. For example, the services comprise multimedia content that includes news, sports, weather, financial information, movies, and/or applications, programs, scripts, or any other type of suitable content or service. Thus, the services may comprise video, audio or other information formatted in any suitable format.

The wide area 1 data and local area A data are input to transmission frame logic 206. The transmission frame logic 206 processes the wide and local area data to produce a transmission frame comprising the data and overhead information. For example, the transmission frame logic 206 comprises encoders, interleavers, scramblers, mappers, and/or any other type of processing logic that operate to format the wide and local area data to produce a transmission frame.

In an aspect, the transmission frame is partitioned in time so that the wide area 1 data is placed in a first partition and the local area A data is placed in a second partition. Thus, one or more boundaries occur between the wide area and local area data in the transmission frame. Furthermore, as described above, both the wide area 1 data and the local area A data are scrambled or encrypted using one or more keys, which allows the data to be directed to selected devices.

Transitional Pilot Symbols

In aspects of the timing synchronization system, transitional pilot symbols are generated and inserted into the transmission frames at the boundaries between wide and local data. As discussed below, the transitional pilot symbols are inserted primarily to assist with data demodulation of wide or local area content scheduled near the transition boundary. The transitional pilot symbols are also configured to allow the timing synchronization system to perform timing synchronization.

The transmission frame logic 206 comprises transitional pilot logic 208 that operates to generate and insert TDM pilot symbols into the generated transmission frames. These TDM pilot symbols are referred to hereinafter as transitional pilot symbols (TPS). The transitional pilot logic 208 configures the transitional pilot symbols so that these symbols can be used for both data demodulation and timing synchronization. In an aspect, each TPS comprises a plurality of modulated sub-carriers where any or all of the sub-carriers are modulated as pilots.

In an aspect, the transitional pilot symbols are configured so that pilot observations from the transitional pilot symbols can be combined with observations from frequency division multiplexed (FDM) pilots included in surrounding data symbols to determine channel estimates for the purposes of data demodulation. A more detailed explanation of how the transitional pilot symbols are used for data demodulation is provided in another section of this document.

In another aspect, the transitional pilot symbols are configured so that pilot observations from the transitional pilot symbols allow receiving devices to determine channel estimates that are longer than twice the expected DS. Such channel estimates eliminate timing ambiguities and are used to determine timing offsets for time tracking synchronization. In an aspect, the transitional pilot symbols are used to determine a channel estimate having a length that extends up to a duration of an FFT used for data transmission. For example, the FFT duration is defined by the number of sub-carriers in a symbol. Thus, a symbol comprising N sub-carriers will be represented by N data points in the time domain.

In an aspect, the transitional pilot logic 208 operates to insert transitional pilot symbols at the boundaries of the wide and local area partitions in the transmission frame. For example, one or more wide area transitional pilot symbol (WTPS) are generated that are configured to assist with data demodulation of wide area data and to provide timing synchronization. Similarly, one or more local area transitional pilot symbol (LTPS) are generated that are configured to assist with data demodulation of local area data and to provide timing synchronization. In an aspect, the WTPS and LTPS are positioned in the transmission frame at the boundaries of the wide and local area partitions.

The transmission frame produced by the transmission frame logic 208 is input to a transmitter logic 210 that operates to modulate the transmission frame into a transmit waveform that is transmitted over the network 108 to the device 102. For example, the transmit waveform is transmitted by the transmitter 204 to the device 102, as shown by path 212.

The device 102 in this aspect comprises a mobile telephone that is operable to communicate with the network 108 through the wireless link 214. In an aspect, the wireless link 214 comprises a forward wireless communication link based on OFDM technology and a reverse link provided by any suitable technology.

The device 102 receives the transmit waveform at receiver 216. The receiver 216 operates to process the received waveform to obtain a baseband waveform that is input to a decoder 218. The decoder 218 operates to decode the baseband waveform to obtain the transmitted content.

In an aspect, receiver 216 comprises a first channel estimator 220 that operates to determine channel estimates for the purpose of data demodulation. With respect to the wide area data in the transmission frame, pilot observations determined from received WTPS are combined with FDM pilot observations from one or more wide area data symbols to produce a channel estimate that can be used for wide area data demodulation. For example, in an aspect, FDM pilots occupy a different set of sub-carriers in each data symbol so that they can be effectively combined across symbols. Typically, FDM pilot observations from three to five consecutive data symbols are combined to obtain a single channel estimate for the purpose of data demodulation. In an aspect, the transitional pilot symbols are configured to have FDM pilots that are at the appropriate set of subcarriers and of the appropriate format to be combined with FDM pilots from surrounding data symbols. Thus, the first channel estimator 220 operates to combine pilot observations from transitional pilot symbols with FDM pilot observations from multiple data symbols for the purposes of obtaining channel estimates for data demodulation. The LTPS may be used in a similar fashion to assist with data demodulation of the local area data in the transmission frame. A more detailed description of how the first channel estimator 220 operates to combine transitional pilot symbols with FDM pilots is provided in another section of this document.

In an aspect, receiving logic 216 comprises a second channel estimator 222 that operates to determine channel estimates for the purposes of timing synchronization. In an aspect, the transitional pilot symbols are configured to provide a large number of pilot observations that can be used by the channel estimator 222 to determine a channel estimate. For example, in an aspect, a transitional pilot symbol is configured so that all of the sub-carriers are modulated with pilot information. Pilot observations from such a symbol are processed to produce a channel estimate that is longer than twice the maximum expected DS, thereby eliminating timing ambiguities. In an aspect, the channel estimator 222 also operates to maintain an averaged channel estimate that is updated with instantaneously computed channel estimates.

A timing synchronizer 224 operates to process the instantaneous channel estimates and averaged channel estimates to determine timing offsets that are used to provide accurate timing synchronization. In an aspect, the timing synchronizer 224 operates to determine a first arriving path (FAP) and a last arriving path (LAP) from the channel estimates produced by the estimator 222. This information is used to determine a timing offset that is used for time tracking synchronization.

Since the channel estimates produced by the estimator 222 are long enough to eliminate timing ambiguities, the timing synchronizer 224 is able to determine accurate timing offsets for timing synchronization.

Thus, aspects of the timing synchronization system provide transitional pilots symbols that allow a receiving device to perform the following functions.

1. Determine channel estimates that are used for data demodulation.
2. Determine channel estimates that are used for accurate time tracking synchronization.

It should be noted that the timing synchronization system is not limited to the implementations described with reference to FIG. 2, and that other implementations are possible within the scope of the aspects. Moreover, timing synchronization information obtained using transitional pilot symbols can be used to assist other methods for timing synchronization.

Figure 3:
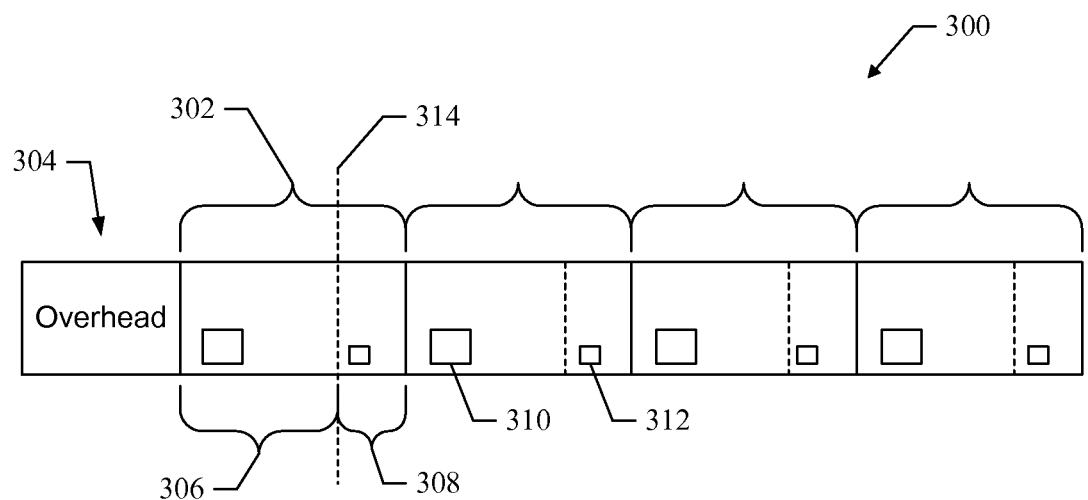
FIG. 3 shows a transmission superframe for use in aspects of a timing synchronization system.

FIG. 3 shows an aspect of a transmission superframe 300 for use in a timing synchronization system. The superframe 300 comprises overhead information 304, and four frames as illustrated by frame 302. Each of the frames comprises a wide area partition 306 and a local area partition 308. The wide area partition 306 comprises wide area data, as shown at 310. The local area partition 308 comprises local area data, as shown at 312. The overhead information 304 operates to identify the locations of the wide area data 310 and the location area data 312 in each frame 303 as well as other information. The boundary line 314 identifies a boundary between the wide area partition 306 and the local area partition 308 in the frame 302. In an aspect, the system operates to insert transitional pilot symbols on both sides of this boundary line. For example, one or more WTPS are inserted at the boundary line 314 in the wide area partition 306, and one or more LTPS are inserted at the boundary line 314 in the local area partition 308. In another aspect, the system operates to insert transitional pilot symbols at any boundary between wide and local area data in the superframe 300, which may also include boundaries in the overhead information 304. In an aspect, the transitional pilot logic 208 shown in FIG. 2 operates to generate and insert the transitional pilot symbols in the transmission superframe 300.

Figure 4:
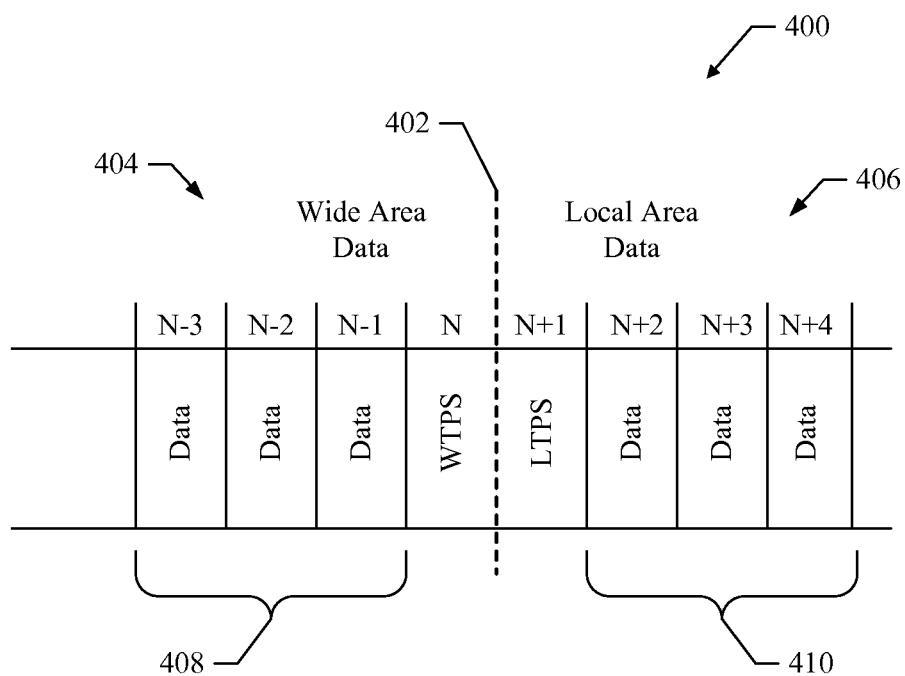
FIG. 4 shows a diagram that illustrates the location of transitional pilot symbols in a transmission frame for use in aspects of a timing synchronization system.

FIG. 4 shows a diagram 400 that illustrates the location of transitional pilot symbols in a transmission frame for use in aspects of a timing synchronization system. The diagram 400 shows a boundary line 402 between a wide area data partition 404 and a local area data partition 406. For example, the boundary line 402 may be the boundary line 314 shown in FIG. 3. The wide area data partition 404 comprises symbols (N−3) through (N) and the local area data partition 406 comprises symbols (N+1) through (N+4).

Data Demodulation

In an aspect, the system operates to determine a channel estimate for the purposes of data demodulation. For example, the channel estimator 220 operates to process transitional pilot symbols for the purpose of data demodulation. In an aspect, transmitted data symbols comprise a portion of symbol sub-carriers modulated with data and a portion of symbol sub-carriers configured as FDM pilots. During data demodulation, pilot observations from a selected number of consecutive data symbols are combined to determine a channel estimate. For example, three consecutive wide area data symbols (at N−3, N−2, and N−1) are illustrated at 408 and three consecutive local area data symbols (at N+2, N+3, and N+4) are illustrated at 410. Pilot observations from the data symbols at 408 are combined to obtain a channel estimate that is used to decode the data symbol (at N−2). Unfortunately, such a channel estimation technique does not work to decode the last wide area data symbol (at N−1). However, in an aspect, the timing synchronization system operates to configure the WTPS (at symbol N) to allow this channel estimation technique to be used to decode the data symbol (at N−1). For example, the WTPS symbol is configured to have the appropriate set of FDM pilots that are of the appropriate format to be combined with the FDM pilots in the wide area data symbols. Thus, pilot observations from the WTPS symbol (at N) can be combined with pilot observations from the wide area data symbols (at N−2, N−1) to determine a channel estimate to decode the data symbol (at N−1). Similarly, the LTPS (at symbol N+1) is configured to have the appropriate set of FDM pilots that are of the appropriate format to be combined with the FDM pilots in the local area data symbols (at N+2, N+3). As a result, pilot observations from the LTPS (at N+1) can be combined with pilot observations from the local area data symbols (at N+2, N+3) to determine a channel estimate that is used to demodulate the local area data symbol (at N+2).

In an aspect, the number of transitional pilot symbols used on each side of the boundary is defined by "k." If the number of data symbols providing pilot observations to be combined is M, then the number of transitional pilot symbols (k) needed can be determined from the equation (M=2k+1). For example, in the above example, pilot observations from three data symbols are combined. Thus, M is equal to three. As a result, the number of transitional pilot symbols (k) used on each side of the boundary is one.

Timing Synchronization

In an aspect, the wide and local transitional pilot symbols (at N, N+1) are used to determine channel estimates for the purposes of time tracking synchronization. For example, the timing synchronization system operates to configure the WTPS and LTPS to comprise pilots in addition to the pilots that are provided for data demodulation. For example, in a data symbol, only one eighth of the sub-carriers may be used as FDM pilots, but in a transitional pilot symbol, any portion which includes all of the sub-carriers can be used as pilots. If all sub-carriers are used as pilots, then at a receiving device pilot observations from the transitional pilot symbols can be used to determine a channel estimate having a length that extends up to a duration of an FFT used for data transmission. Such a channel estimate eliminates timing ambiguities and provides for accurate time tracking synchronization. A more detailed description of the configuration of the transitional pilot symbols is provided in another section of this document.

Figure 5:
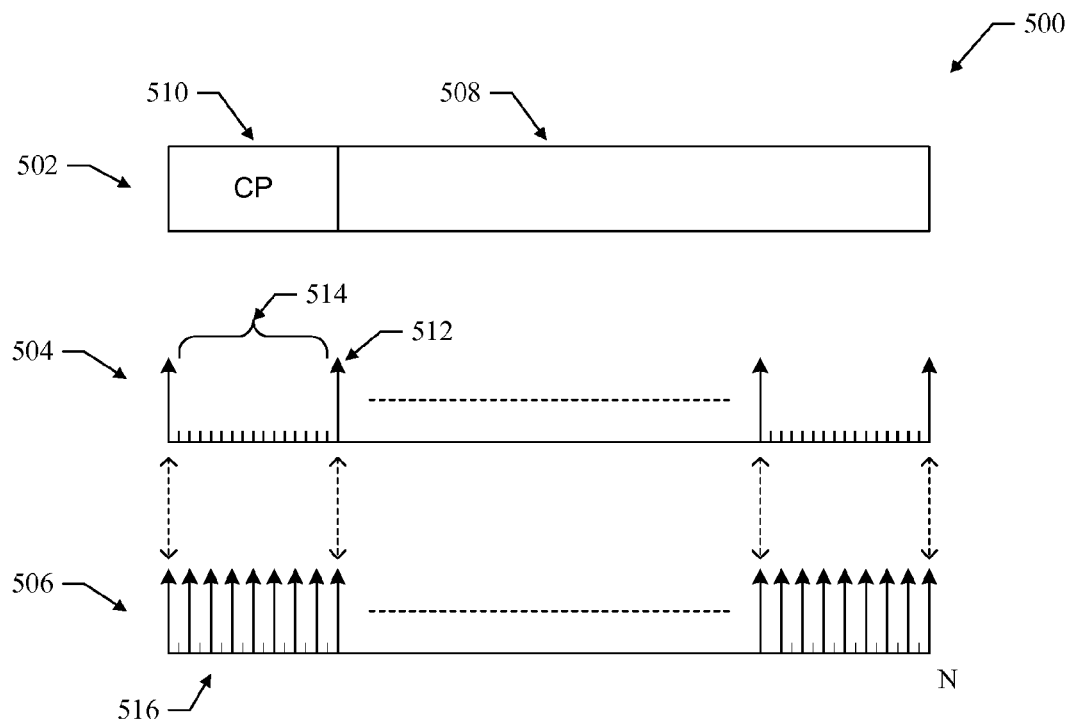
FIG. 5 illustrates symbols for use in aspects of a timing synchronization system.

FIG. 5 illustrates symbols 500 for use in aspects of a timing synchronization system. The symbols 500 comprise a time domain symbol 502, a frequency domain data symbol 504 and a frequency domain transitional pilot symbol 506.

The time domain symbol 502 comprises time domain data 508 and a cyclic prefix 510. Aspects of the timing synchronization system operate to accurately determine timing offsets that are used to detect symbol boundaries so that the data contain in each symbol can be collected for processing.

The frequency domain data symbol 504 comprises N subcarriers wherein some small portion of the sub-carriers are configured as pilots, as shown at 512, and are distributed throughout the data symbol 504 as FDM pilots. The remaining sub-carriers are modulated with data, such as illustrated at 514. As described with reference to FIG. 4, pilot observations from three consecutive data symbols are used to determine a channel estimate for the purposes of data demodulation.

The frequency domain transitional pilot symbol 506 comprises N sub-carriers where some or all of the sub-carriers are configured as pilots, and some of these pilots are appropriately located and formatted to allow combining with FDM pilots in the data symbol 504. This allows the transitional pilot symbol 506 to be utilized for data demodulation by allowing pilot observations from received transitional pilot symbols to be combined with pilot observations from received data symbols as described with reference to FIG. 4.

Since the transitional pilot symbol 506 can comprise all pilots (or a large number of pilots), a receiving device utilizing all the pilot observations is able to determine a channel estimate that is greater than twice the expected maximum delay spread. Aspects of the timing synchronization system process this channel estimate to determined timing offsets that are used to provide accurate time tracking synchronization. By producing such a long channel estimate, timing ambiguities associated with signal detection are eliminated.

In an aspect, any of the sub-carriers of the transitional pilot symbol 506 can be pilots so that as the number of sub-carriers that are configured as pilots increases, the length of the resulting channel estimate increases up to the duration of the FFT associated with the OFDM network in which the device operates.

Figure 6:
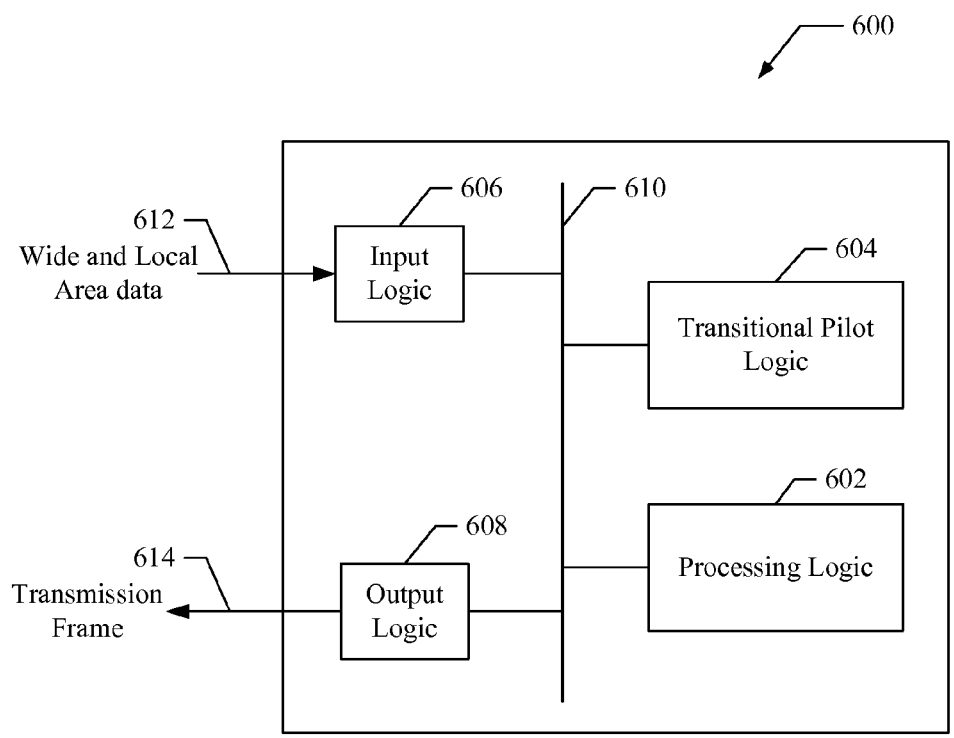
FIG. 6 shows transmission frame logic for use in aspects of a timing synchronization system.

FIG. 6 shows transmission frame logic 600 for use in aspects of a timing synchronization system. For example, the transmission frame logic 600 is suitable for use as the transmission frame logic 206 shown in FIG. 2. The transmission frame logic 600 comprises processing logic 602, transitional pilot logic 604, input logic 606, and output logic 608, all coupled to a data bus 610.

The input logic 606 comprises any suitable hardware and/or software that operate to receive local and wide area data 612. For example, the local and wide area data 612 comprises multimedia content, services, or other data that is to be included in a transmission frame for transmission over a network. The input logic 606 operates to make the local and wide area data available over the data bus 610.

The transitional pilot logic 604 comprises a CPU, processor, gate array, hardware logic, virtual machine, software, and/or any combination of hardware and software. The transitional pilot logic 604 operates to generate transitional pilot symbols to be included in a transmission frame. Each transitional pilot symbol comprises a selected number of sub-carriers that are modulated as pilots.

In an aspect, the transitional pilot logic 604 operates to generate both WTPS and LTPS. The WTPS and LTPS are configured so that pilot observations from these symbols can be used at a receiving device for the purposes of data demodulation and time tracking synchronization as described above. In an aspect, the WTPS and LTPS are generated according to the symbol 506 shown in FIG. 5. The transitional pilot logic 604 sends the transitional pilot symbols to the processing logic 602 using the data bus 610.

The processing logic 602 comprises a CPU, processor, gate array, hardware logic, virtual machine, software, and/or any combination of hardware and software. The processing logic 602 operates to generate a transmission frame that includes the wide and local area data and the transitional pilot symbols. For example, the processing logic 602 formats the wide area and local area data into partitions within the transmission frame and inserts the transitional pilot symbols at the boundaries. For example, in an aspect, the processing logic 602 operates to generate the transmission frame 300 shown in FIG. 3.

The output logic 608 comprises any suitable hardware and/or software that operate to output the transmission frame 614 generated by the processing logic 602 to a transmitter that is configured to transmit the transmission frame over a network.

In an aspect, the timing synchronization system comprises a computer program having one or more program instructions ("instructions") or sets of codes ("codes") stored on a computer-readable medium, which when executed by at least one processor, for instance, a processor located at the processing logic 602, operates to provide the functions of the timing synchronization system described herein. For example, the codes may be loaded into the processing logic 602 from a computer-readable media, such as a floppy disk, CDROM, memory card, FLASH memory device, RAM, ROM, or any other type of memory device or computer-readable medium that interfaces to the processing logic 602. In another aspect, the codes may be downloaded into the processing logic 602 from an external device or network resource. The codes, when executed operate to provide aspects of a timing synchronization system as described herein.

Thus, the transmission frame logic 600 operates to generate and insert transitional pilot symbols into a transmission frame for distribution over a network. It should be noted that the transmission frame logic 600 is just one implementation and that other implementations are possible within the scope of the aspects.

Figure 7:
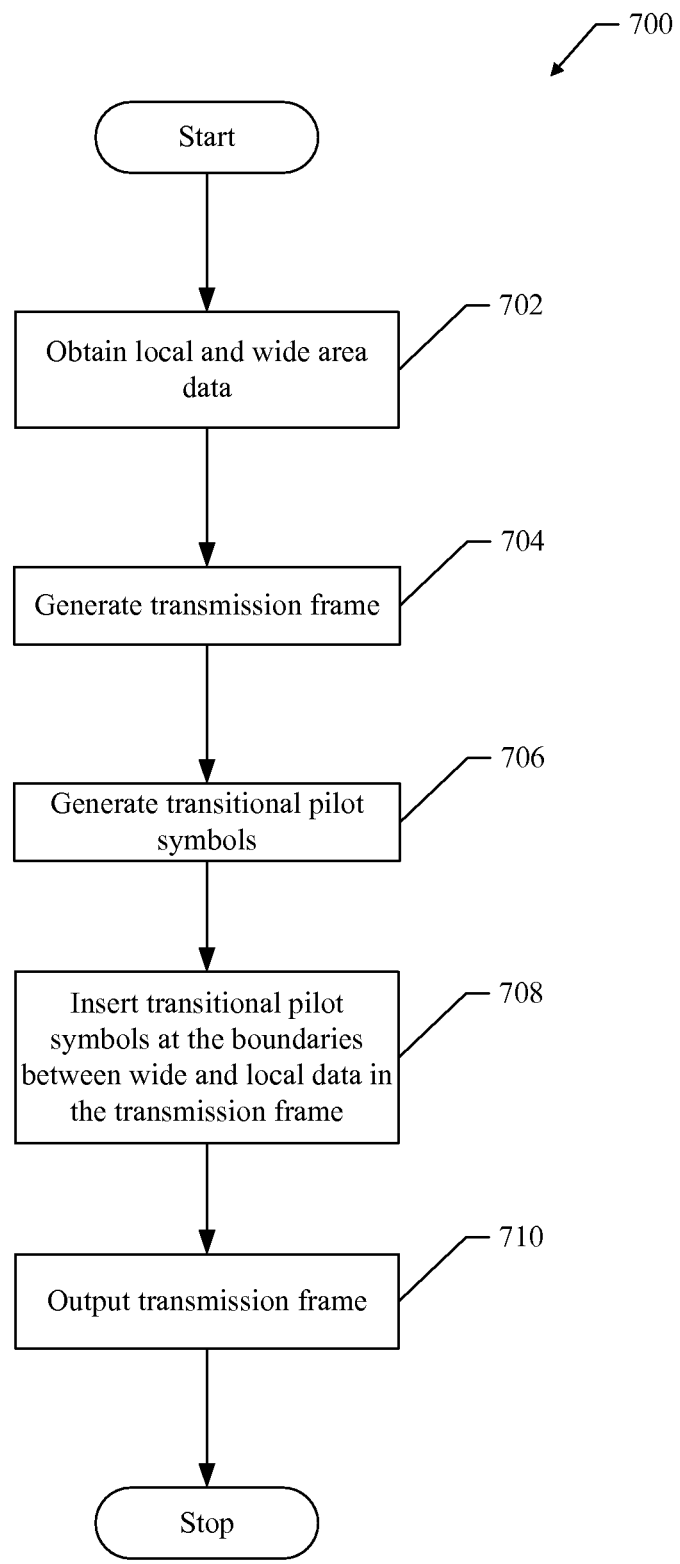
FIG. 7 shows a method for generating transitional pilot symbols for use in aspects of a timing synchronization system.

FIG. 7 shows a method 700 for generating transitional pilot symbols for use in aspects of a timing synchronization system. For example, in an aspect, the method 700 is performed by the transmission frame logic 600 shown in FIG. 6.

At block 702, local and wide area data is obtained. For example, in an aspect, the local and wide area data is received at the input logic 606 and passed to the processing logic 602 using the data bus 610.

At block 704, a transmission frame is generated. For example, in an aspect, the processing logic 602 operates to generate a transmission frame that contains data symbols representing the wide and local area content. For example, the processing logic 602 generates the transmission superframe 300 shown in FIG. 3 which comprises four frames each having wide and local area partitions separated by boundaries.

At block 707, transitional pilot symbols are generated. In an aspect, the transitional pilot logic 604 operates to generate one or more WTPS and LTPS for insertion in a transmission frame. In an aspect, each transitional pilot symbol comprises a selected number of sub-carriers that are modulated as pilots. In an aspect, the transitional pilot symbols are configured to allow receiving devices to perform data demodulation as described above. In another aspect, the transitional pilot symbols are configured to allow receiving devices to determine channel estimates that are used for time tracking synchronization as described above. For example, the transitional pilot symbols are configured to have a large number of pilot observations that can be used to produce a channel estimate having a length that extends up to a duration of an FFT used for data transmission. The generated transitional pilot symbols are then passed to the processing logic 602.

At block 708, the transitional pilot symbols are inserted into a transmission frame. For example, in an aspect, the processing logic 602 operates to insert one or more transitional pilot symbols at the boundaries between wide area data and local area data in the transmission frame. For example, the WTPS and LTPS are inserted at the boundary 402 as illustrated in FIG. 4.

At block 710, a transmission frame that includes transitional pilot symbols is output to a transmitter for transmission over a network. For example, the output logic 608 outputs the transmission frame that includes the transitional pilot symbols generated by the processing logic 602. In an aspect, the transmission frame is output to a transmitter logic that operates to transmit the transmission frame in a transmit waveform over a network.

Thus, the method 700 operates to generate and insert transitional pilot symbols in a transmission frame for transmission over a network. The transitional pilot symbols provide pilot observations to allow a receiving device to perform data demodulation of wide and local area data. The transitional pilot symbols also provide a large number of pilot observations to allow receiving devices to perform accurate time tracking synchronization. For example, any portion or all of the sub-carriers of a transitional pilot symbol are modulated as pilots so that a receiving device can use these pilot observations to determine a channel estimate having a length that extends up to a duration of an FFT used for data transmission.

It should be noted that the method 700 represents just one implementation and the changes, additions, deletions, combinations or other modifications of the method 700 are possible within the scope of the aspects.

Figure 8:
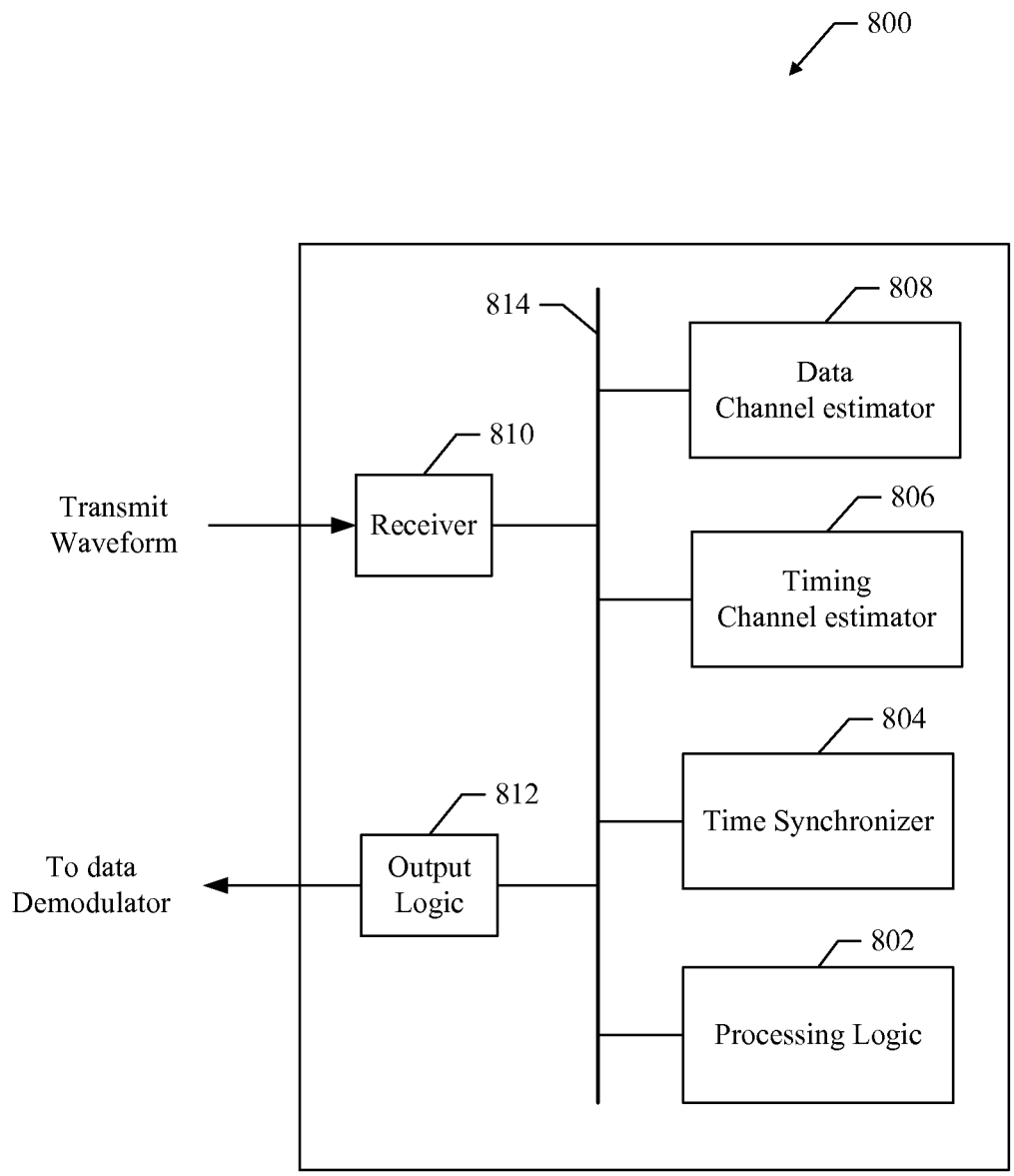
FIG. 8 shows receiving logic for use in aspects of a timing synchronization system.

FIG. 8 shows receiving logic 800 for use in aspects of a timing synchronization system. For example, the receiving logic 800 is suitable for use as the receiver 216 shown in FIG. 2. The receiving logic 800 comprises processing logic 802, time synchronizer 804, timing channel estimator 806, data channel estimate 808, receiver 810 and output logic 812 all coupled to a data bus 814.

The receiver 810 comprises any suitable hardware and/or software that operates to receive a transmit waveform. For example, the receiver 810 comprises a CPU, filters, amplifiers, A/D converters, decoders, and/or any other suitable hardware and/or software for receiving a transmit waveform. In an aspect, the received transmit waveform comprises a transmission frame that comprises overhead information, wide area data, local area data, and transitional pilot symbols, as illustrated in FIG. 3.

The data channel estimator 808 comprises a CPU, processor, gate array, hardware logic, memory, virtual machine, software, and/or any combination of hardware and software. The data channel estimator 808 operates to determine channel estimates for the purposes of demodulation of the wide and local area data included in the transmission frame.

In an aspect, the data channel estimator 808 combines FDM pilot observation from three consecutive data symbols to determine a channel estimate that is used to demodulate the middle data symbol. This process is performed for both wide and local area data. To produce a channel estimate to demodulate the first or last data symbol in a wide or local partition, the data channel estimator 806 uses pilot observations from adjacent transitional pilot symbols as described with reference to FIG. 4. In an aspect, the transitional pilot symbols have pilots at the same locations as the FDM pilots in the data symbols. Thus, the data channel estimator 808 operates to combine pilot observations from received transitional pilot symbols with pilot observations from data symbols to produce channel estimates for the purpose of data demodulation.

The timing channel estimator 806 comprises a CPU, processor, gate array, hardware logic, memory, virtual machine, software, and/or any combination of hardware and software. The timing channel estimator 806 operates to determine channel estimates for the purposes of time tracking synchronization associated with the wide and local area data included in the transmission frame.

In an aspect, the timing channel estimator 806 operates to determine a channel estimate based on pilot observations from transitional pilot symbols. For example, a transitional pilot symbol is received where all or any portion of the sub-carriers are pilots. The timing channel estimator 806 then processes the pilot observations to produce a timing channel estimate. The timing channel estimate has a length based on the number of pilot observations that are processed, and so the length of the timing channel estimate having a length that extends up to a duration of an FFT used for data transmission in the network in which the device is operating. In an aspect, the timing channel estimator 806 operates to maintain an averaged channel estimate that incorporates computed instantaneous channel estimates.

The time synchronizer 804 comprises a CPU, processor, gate array, hardware logic, virtual machine, software, and/or any combination of hardware and software. The time synchronizer 804 operates to process timing channel estimates produced by the timing channel estimator 806 to determine a timing offset for timing synchronization. A more detailed discussion of the timing algorithm is provided in another section of this document.

The processing logic 802 comprises a CPU, processor, gate array, hardware logic, virtual machine, software, and/or any combination of hardware and software. The processing logic operates to receive the timing channel estimate information from the data channel estimator 808, timing channel estimator 806, and timing synchronization information from the time synchronizer 804, and output this information using the output logic 810 to a data demodulator. In an aspect, the output logic 810 comprises any suitable hardware and/or software that operate to output channel estimates and timing synchronization information.

In an aspect, the timing synchronization system comprises a computer program having one or more program instructions ("instructions") or sets of codes ("codes") stored on a computer-readable medium, which when executed by at least one processor, for instance, a processor located at the processing logic 802, operates to provide the functions of the timing synchronization system described herein. For example, the codes may be loaded into the processing logic 802 from a computer-readable media, such as a floppy disk, CDROM, memory card, FLASH memory device, RAM, ROM, or any other type of memory device or computer-readable medium that interfaces to the processing logic 802. In another aspect, the codes may be downloaded into the processing logic 802 from an external device or network resource. The codes, when executed operate to provide aspects of a timing synchronization system as described herein.

Thus, the receiver 800 operates to receive a transmission frame and perform data demodulation and time tracking synchronization based on transitional pilot symbols included in the transmission frame. It should be noted that the receiver 800 is just one implementation and that other implementations are possible within the scope of the aspects.

Figure 9:
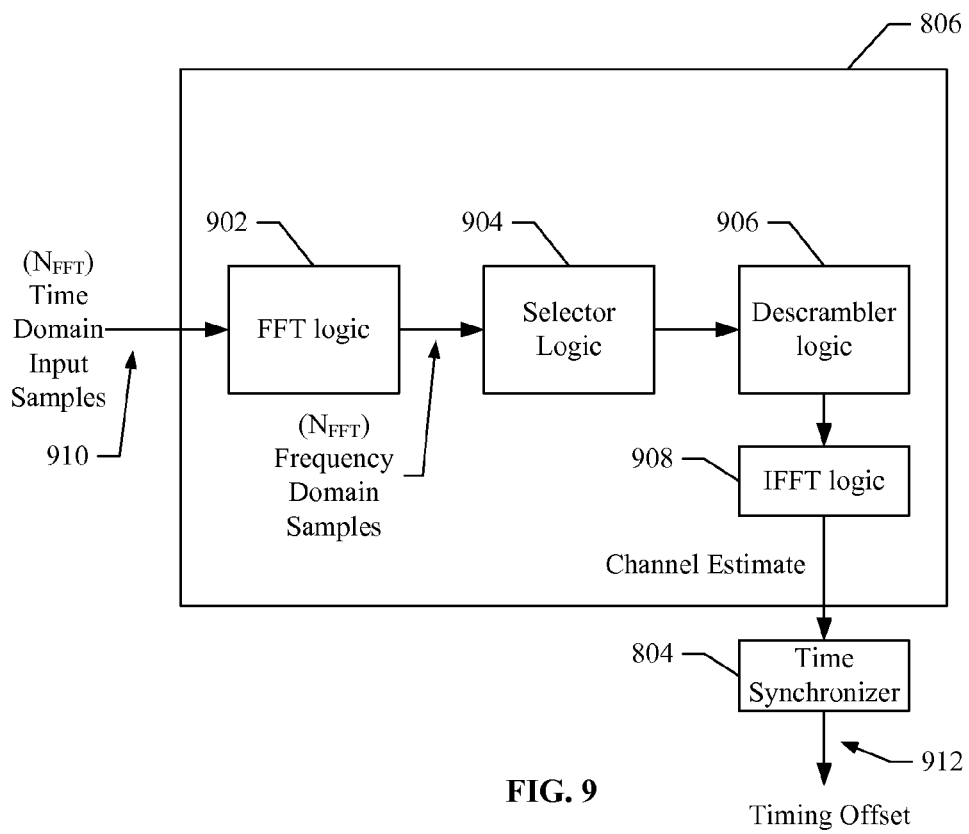
FIG. 9 shows aspects of a timing channel estimator and a time synchronizer for use in aspects of a timing synchronization system.

FIG. 9 shows aspects of the timing channel estimator 806 and the time synchronizer 804 for use in a timing synchronization system. The timing channel estimator 806 comprises FFT logic 902, selector logic 904, descrambler logic 906, and inverse FFT (IFFT) logic 908.

The FFT logic 902 comprises a CPU, processor, gate array, hardware logic, virtual machine, software, and/or any combination of hardware and software. The FFT logic 902 operates to receive ($N_{FFT}$) time domain input samples 910 of a symbol and uses any suitable FFT algorithm or technique to produce ($N_{FFT}$) output samples in the frequency domain. For example, in an aspect, the input samples 910 represent time-domain samples of a transitional pilot symbol and the output samples represents a set of modulated sub-carriers.

The selector logic 904 comprises a CPU, processor, gate array, hardware logic, virtual machine, software, and/or any combination of hardware and software. The selector logic 904 operates to receive the frequency domain sub-carriers and select any portion of the sub-carriers for processing. For example, the selector logic 904 selects any portion of the pilot observations from a received transitional pilot symbol. The output of the selector logic 904 is input to the descrambler logic 906.

The descrambler logic 906 comprises a CPU, processor, gate array, hardware logic, virtual machine, software, and/or any combination of hardware and software. The descrambler logic 906 operates to descramble the selected sub-carriers received from the selector logic 904 based on one or both of a descrambling key and a known pilot sequence. For example, the descrambling key may be provided to the receiving device during network initialization and/or registration and the known pilot sequence may be written to the receiving device's memory during manufacture. In an aspect, the descrambling key may be implicitly present in the known pilot sequence. The pilot sequence may be stored at the receiver, or it can be generated from scratch at the receiver starting from known scrambler hardware logic and the descrambling key. The output of the descrambler logic 906 comprises selected frequency domain pilot observations derived from a received transitional pilot symbol. The descrambler 906 output is then input to the IFFT logic 908.

The IFFT logic 908 comprises a CPU, processor, gate array, hardware logic, virtual machine, software, and/or any combination of hardware and software. The IFFT logic 908 operates to perform any suitable algorithm or technique to perform an inverse FFT function of the output of the descrambler 906 to determine a timing channel estimate in the time domain. Based on the number of pilot observations processed, the timing channel estimate has a length that extends up to the duration of an FFT associated with the OFDM network in which the device is operating. In an aspect, the IFFT logic 908 maintains an averaged channel estimate based on the computed instantaneous channel estimates. The IFFT logic 908 then outputs the instantaneous channel estimate and the averaged channel estimate to the time synchronizer 804.

The time synchronizer 804 comprises a CPU, processor, gate array, hardware logic, virtual machine, software, and/or any combination of hardware and software. The time synchronizer 804 operates to receive the instantaneous and averaged timing channel estimates from the channel estimator logic 806 and perform a time synchronization algorithm to determine a timing offset for time tracking synchronization.

Time Synchronization Algorithm

Figure 10:
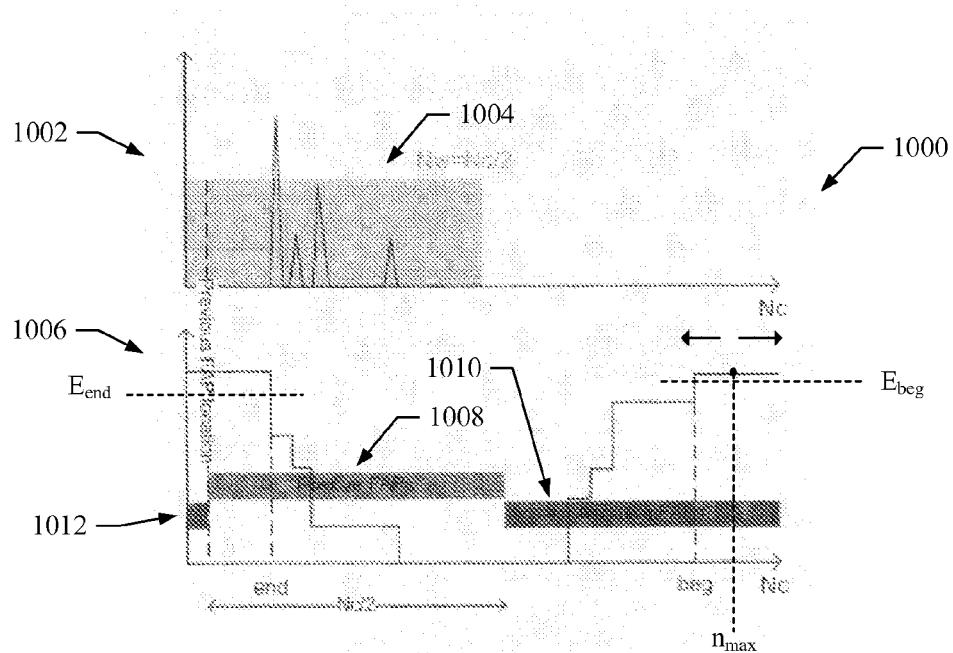
FIG. 10 shows graphs illustrating the operation of a time synchronizer for use in aspects of a timing synchronization system.

FIG. 10 shows graphs 1000 illustrating the operation of the time synchronizer 804 for use in aspects of a timing synchronization system. For example, the time synchronizer 804 operates to process instantaneous and averaged timing channel estimates to detect a FAP and a LAP. In an aspect, the FAP and LAP represent the first and last arriving paths of a particular symbol. For example, a symbol may be transmitted from multiple transmitters and/or may experience spreading and/or multipath propagation effects. The FAP and LAP indicate the beginning of the received symbol energy and ending of the received symbol energy and are used to determine a timing offset that is used for timing tracking synchronization.

In an aspect, the timing synchronization system operates to perform one or more of the following functions to determine timing offsets for time tracking synchronization.

1. Receive one or more transitional pilot symbols.
2. Compute an instantaneous time-domain channel estimate (for example, pilot observations from 2000 even sub-carriers of a transitional pilot symbol are used to compute the instantaneous channel estimate).

3. Maintain an averaged channel estimate using the instantaneous channel estimate.
4. Compute instantaneous $FAP_{inst}$ and $LAP_{inst}$ based on the instantaneous channel estimate.
5. Compute averaged $FAP_{avg}$ and $LAP_{avg}$ based on the averaged channel estimate.
6. Determine a timing offset.

In an aspect, the time synchronizer 804 operates to process the instantaneous channel estimate to determine the $FAP_{inst}$ and $LAP_{inst}$ parameters. The time synchronizer 804 also processes the averaged channel estimate to determine the $FAP_{avg}$ and $LAP_{avg}$ parameters.

The following timing algorithm is performed by the time synchronizer 804 to process both the instantaneous channel estimate and the averaged channel estimate. To avoid redundancy, the algorithm is described below with reference to processing the instantaneous channel estimate to determine the $FAP_{inst}$ and $LAP_{inst}$ parameters. The averaged channel estimate can be processed in the same way to determine $FAP_{avg}$ and $LAP_{avg}$ parameters.

Referring now to FIG. 10, a first graph illustrates an instantaneous timing channel estimate 1002 generated by the channel estimator 806. The timing channel estimate 1002 has a length parameter of $N_c$, which is determined from the number of pilot observations selected and processed from a received transitional pilot symbol. A window 1004 is defined that has a length of $N_c/2$, however a shorter window may be defined. The window 1004 is moved through the timing channel estimate 1002 and the energy within the window is accumulated to produce an accumulated energy profile that is illustrated in the graph 1006.

In an aspect, the time synchronizer 804 operates to process the accumulated energy profile to determine beginning (beg) and end (end) parameters. The time synchronizer 804 operates to perform the following algorithm to determine the "beg" and "end" parameters from the accumulated energy profile 1006.
1. Find the location of the maximum accumulated energy ($n_{max}$) and the maximum energy ($E_{max}$) value.
2. Set beginning ($E_{beg}$) and ending ($E_{end}$) energy thresholds based on $E_{max}$. These thresholds may be the same or different.
3. Starting from the location of $n_{max}$ and search up to $N_w$ positions in both directions.
4. Detect the "beg" and "end" locations at the first crossings of the corresponding thresholds.

Once the "beg" and "end" locations are determined, the instantaneous $FAP_{inst}$ and $LAP_{inst}$ parameters are calculated. The following algorithm is used to determine $FAP_{inst}$ and $LAP_{inst}$ parameters.
1. If
  end is in the positive region (1008) or the negative+region (1012); then;
  $FAP_{inst}$=end;
  $LAP_{inst}$=(beg+$N_w$)% $N_c$;
2. If
  end is in the negative region–(1010) then
  $FAP_{inst}$=end–$N_c$
  $LAP_{inst}$=(beg+$N_w$)% $N_c$ In an aspect, once the $FAP_{inst}$, $LAP_{inst}$, $FAP_{avg}$, and $LAP_{avg}$ are determined, they are combined to produce final FAP and LAP values according to the following.

$$FAP=min(FAP_{inst}, FAP_{avg})$$

$$LAP=max(LAP_{inst}, LAP_{avg})$$

A timing offset is then determined from the FAP and LAP values. In an aspect, the timing synchronizer 804 has stored values for two parameters referred to as Dmid and Backoff. The stored Dmid parameter represents a desired location for the mid point of the channel. The Backoff parameter indicates a boundary for the maximum applied offset to the channel.

In an aspect, the timing synchronizer 804 computes a value referred to a Dmid according to the following expression.

$$D_{mid}=(FAP+LAP)/2$$

A timing offset, which represents an amount the channel is to be shifted to arrive at the desired point Dmid, is computed according to the following expression.

$$Offset=D_{mid}-Dmid$$

The timing offset is applied by the receiver to provide time synchronization so that symbols of received transmission frames can be accurately decoded. However, it may be undesirable to adjust the channel if the offset value is too large. In this situation, the Backoff parameter is used to set the limit of the offset adjustment. In an aspect, if the offset exceeds a selected value, the Backoff parameter is used to compute the offset according to the following expression.

$$Offset=FAP-Backoff$$

Thus, the time synchronizer 804 operates to process a channel estimate derived from a transitional pilot symbol to determine a timing offset that is applied to determine symbol boundaries at a receiving device.

Figure 11:
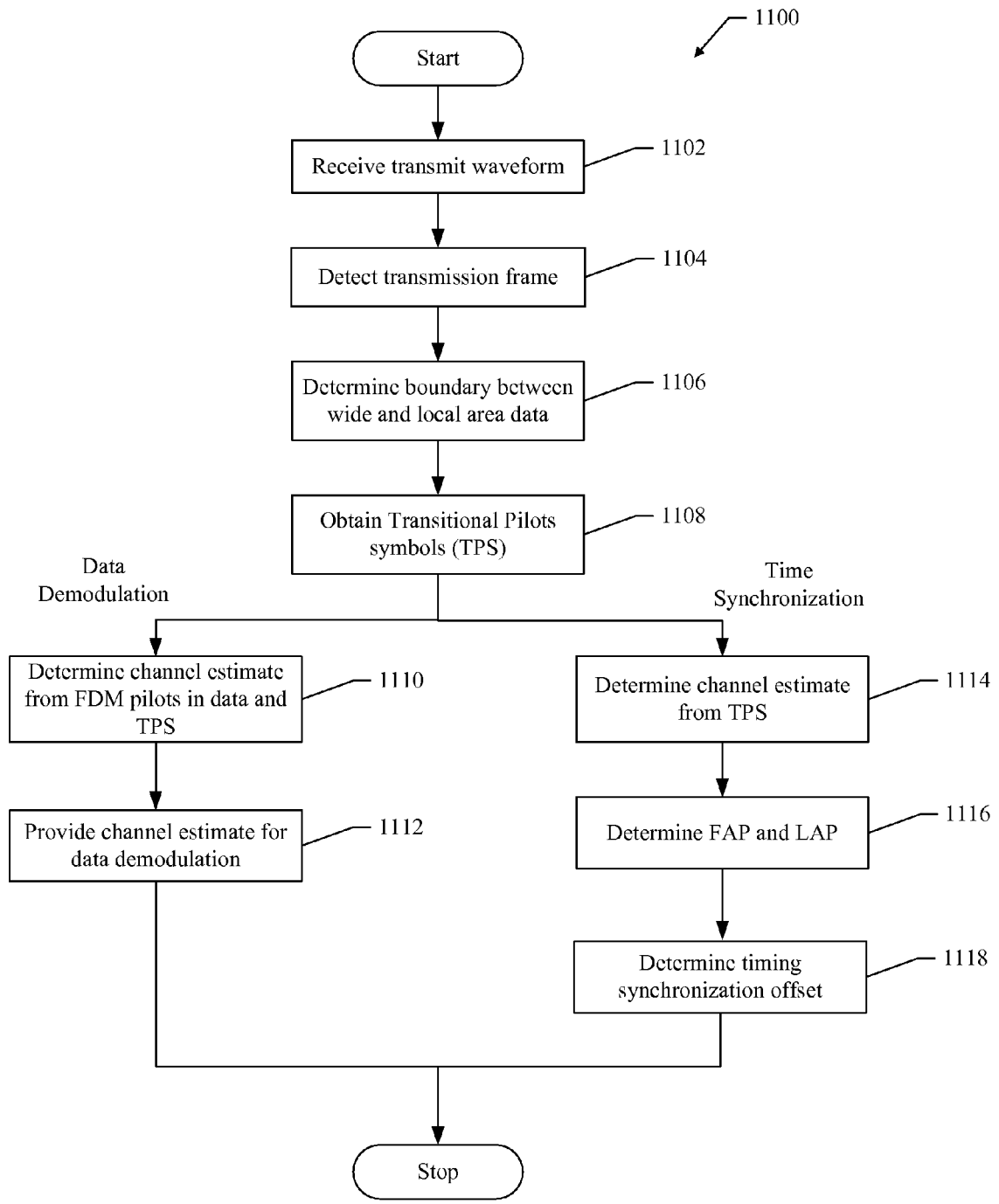
FIG. 11 shows a method for operating a device for use in aspects of a timing synchronization system.

FIG. 11 shows a method 1100 for processing transitional pilot symbols for use in aspects of a timing synchronization system. For example, in an aspect, the receiver 800 is configured to perform the method 1100 as describe below.

At block 1102, a transmit waveform is received. For example, the receiver 810 operates to receive the transmit waveform from a network communication.

At block 1104, a transmission frame is detected. For example, in an aspect, the receiver 810 operates to detect a transmission frame in the received transmit waveform. The transmission frame comprises four frame having local and wide area data partitions separated by a boundaries. The transmission frame also comprises transitional pilot symbols located at the boundaries. For example, the receiver 810 detects the transmission frame, which may be constructed as the transmission frame 300 as illustrated in FIG. 3.

At block 1106, a boundary location is determined between a wide area partition and a local area partition in the transmission frame. For example, in an aspect, the detected boundary is the boundary 402 illustrated in FIG. 4 and is detected by the processing logic 802.

At block 1108, transitional pilot symbols are obtained. In an aspect, the timing channel estimator 806 obtains time domain transitional pilot symbols located at the boundary between the wide area and local area data partitions for the purpose of time synchronization. In an aspect, the data channel estimator 808 obtains the transitional pilot symbols for the purpose of data demodulation.

To process the transitional pilot symbols for data demodulation, the method proceeds to block 1110. To process the transitional pilot symbols for timing synchronization the method proceeds to block 1114. It should be noted that processing transitional pilot symbols for data demodulation and/or timing synchronization can be performed either in parallel or serial fashion depending on the timing system implementation.

At block 1110, a channel estimate is determined from FDM pilots in one or more data symbols and one or more TPS symbols for the purpose of demodulating a first or last data symbol in a wide or local data partition. In an aspect, the data channel estimator 808 combines FDM pilots from consecutive data symbols with pilots from one or more transitional pilot symbols. For example, the FDM pilots are combined as described with reference to FIG. 4 to produce a channel estimate. In an aspect, the expression (M=2k+1) describes the number of data symbols and the number of transitional pilot symbols that are to be used to provide pilot observations to produce a channel estimate.

At block 1112, the data channel estimate is provided for data demodulation. In an aspect, the data channel estimator 808 outputs the data channel estimate to a data demodulator so that a first or last data symbol in a wide or local data partition can be demodulated.

At block 1114, a channel estimate is determined from pilot observations in a transitional pilot symbol. For example, the timing channel estimator 806 operates to determine a channel estimate having a length that extends up to a duration of an FFT used for data transmission. Thus, the channel estimate is long enough that timing ambiguities are eliminated. For example, the channel estimate is represented by the channel estimate 1002 shown in FIG. 10.

At block 1116, a FAP and LAP are determined. In an aspect, the timing synchronizer operates to receive the channel estimate from the timing channel estimator 806 and determine instantaneous and averaged FAP and LAP values based on "beg" and "end" locations determined by the timing algorithm described above. The instantaneous FAP and LAP are combined with averaged FAP and LAP to determine final FAP and LAP values as described above.

At block 1118, a timing offset is determined. In an aspect, the timing synchronizer operates to determine a timing offset based on the FAP and LAP. For example, the timing offset represents an amount the channel delay spread (FAP+LAP)/2 is to be shifted to arrive at a desired point referred to as Dmid. If the channel is to be shifted beyond a desired point, the timing offset is determined by subtracting a Backoff parameter from FAP. This sets a limit on the amount of shift provided by the timing offset. The timing offset is then applied to determine the symbol boundaries.

Thus, the method 1100 operates to process transitional pilot symbols for the purposes of data demodulation and timing synchronization at a receiving device. It should be noted that the method 1100 represents just one implementation and the changes, additions, deletions, combinations or other modifications of the method 1100 are possible within the scope of the aspects.

Figure 12:
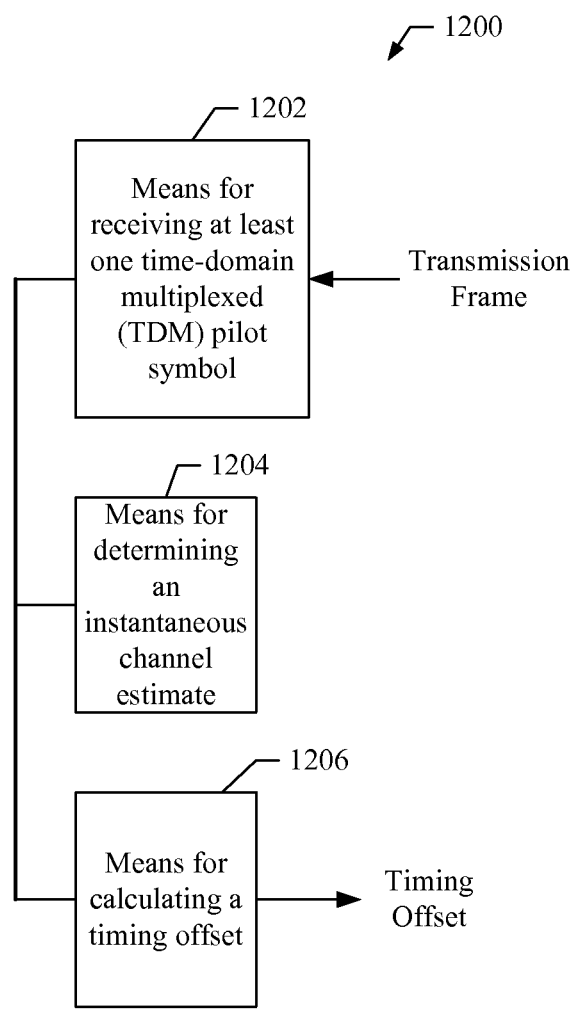
FIG. 12 shows an aspect of a timing synchronization system.

FIG. 12 shows an aspect of a timing synchronization system 1200. The timing synchronization system 1200 comprises a first module 1202 that comprises means for receiving at least one TDM pilot symbol comprising a plurality of modulated sub-carriers that are configured to provide a channel estimate having a length that extends up to a duration of an FFT used for data transmission. For example, in an aspect, the module 1202 comprises the receiver 810.

The timing synchronization system 1200 also comprises a second module 1204 that comprises means for determining an instantaneous channel estimate from the plurality of modulated sub-carriers. For example, in an aspect, the module 1204 comprises the timing channel estimator 806.

The timing synchronization system 1200 also comprises a third module 1206 that comprises means for calculating a timing offset based on the instantaneous channel estimate. For example, in an aspect, the module 1206 comprises the time synchronizer 804.

In an aspect, the modules (1202-1206) comprise one or more processors configured to execute one or more sets of codes to provide aspects of a timing synchronization system as described herein.

Therefore various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium is coupled to the processor, such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The description of the disclosed aspects is provided to enable any person skilled in the art to make or use the present invention. Various modifications to these aspects may be readily apparent to those skilled in the art, and the generic principles defined herein may be applied to other aspects, e.g., in an instant messaging service or any general wireless data communication applications, without departing from the spirit or scope of the invention. Thus, the present invention is not intended to be limited to the aspects shown herein but is to be accorded the widest scope consistent with the principles and novel features disclosed herein. The word "exemplary" is used exclusively herein to mean "serving as an example, instance, or illustration." Any aspect described herein as "exemplary" is not necessarily to be construed as preferred or advantageous over other aspects.

Accordingly, while aspects of a timing synchronization system have been illustrated and described herein, it will be appreciated that various changes can be made to the aspects without departing from their spirit or essential characteristics. Therefore, the disclosures and descriptions herein are intended to be illustrative, but not limiting, of the scope of the invention, which is set forth in the following claims.

What is claimed is:

1. A method for time tracking synchronization in an orthogonal frequency-division multiplex (OFDM) system, the method comprising:
  receiving, by a mobile device, at least one time-division multiplexed (TDM) transitional pilot symbol comprising a plurality of modulated sub-carriers that provide a channel estimate having a length that is equal to a duration of an FFT used for data, wherein the at least one TDM transitional pilot symbol provides the channel estimate having the length equal to the duration of the FFT used for data when all sub-carriers of the at least one TDM transitional pilot symbol are modulated as pilots, and wherein the at least one TDM transitional pilot symbol is positioned within a superframe at a boundary between wide area data and local area data;

determining an instantaneous channel estimate from the plurality of modulated sub-carriers included in the at least one TDM transitional pilot symbol; and calculating a timing offset based on the instantaneous channel estimate.

2. The method of claim 1, wherein the boundary corresponds to a boundary of a data partition.

3. The method of claim 1, wherein the at least one TDM transitional pilot symbol comprises at least one of one or more wide area transitional pilot symbols (WTPS) and one or more local area transitional pilot symbols (LTPS).

4. The method of claim 1, wherein said calculating comprises calculating an instantaneous first arriving path ($FAP_{inst}$) and an instantaneous last arriving path ($LAP_{inst}$) from the instantaneous channel estimate.

5. The method of claim 4, wherein said determining comprises maintaining an averaged channel estimate.

6. The method of claim 5, wherein said calculating comprises calculating an averaged first arriving path ($FAP_{avg}$) and an averaged last arriving path ($LAP_{avg}$) from the averaged channel estimate.

7. The method of claim 6, wherein said calculating comprises calculating the timing offset based on at least one of the $FAP_{inst}$, the $LAP_{inst}$, the $FAP_{avg}$, and the $LAP_{avg}$.

8. The method of claim 7, wherein said calculating comprises calculating a FAP and a LAP according to FAP=min($FAP_{inst}$, $FAP_{avg}$) and LAP=max($LAP_{inst}$, $LAP_{avg}$).

9. The method of claim 8, wherein said calculating comprises calculating a $D_{mid}$ parameter according to $D_{mid}$=(FAP+LAP)/2.

10. The method of claim 9, wherein said calculating comprises calculating the timing offset based on a desired mid point (Dmid) according to offset=$D_{mid}$−Dmid.

11. The method of claim 9, wherein said calculating comprises calculating the timing offset based on a Backoff parameter according to offset=FAP−Backoff.

12. The method of claim 1, wherein the length of the channel estimate is determined from a number of pilot observations of the plurality of modulated sub-carriers in the TDM transitional pilot symbol.

13. An apparatus for time tracking synchronization in an orthogonal frequency-division multiplex (OFDM) system, the apparatus comprising:

a mobile device including:

a receiver to receive at least one time-division multiplexed (TDM) transitional pilot symbol comprising a plurality of modulated sub-carriers that are configured to provide a channel estimate having a length that is equal to a duration of an FFT used for data transmission, wherein the at least one TDM transitional pilot symbol provides the channel estimate having the length equal to the duration of the FFT used for data when all sub-carriers of the at least one TDM transitional pilot symbol are modulated as pilots, and wherein the at least one TDM transitional pilot symbol is positioned within a superframe at a boundary between wide area data and local area data;

a channel estimator to determine an instantaneous channel estimate from the plurality of modulated sub-carriers included in the at least one TDM transitional pilot symbol; and a time synchronizer to calculate a timing offset based on the instantaneous channel estimate.

14. The apparatus of claim 13, wherein the boundary corresponds to a boundary of a data partition.

15. The apparatus of claim 13, wherein the at least one TDM transitional pilot symbol comprises at least one of one or more wide area transitional pilot symbol (WTPS) and one or more local area transitional pilot symbol (LTPS).

16. The apparatus of claim 13, wherein said time synchronizer is configured to calculate an instantaneous first arriving path ($FAP_{inst}$) and an instantaneous last arriving path ($LAP_{inst}$) from the instantaneous channel estimate.

17. The apparatus of claim 16, wherein said channel estimator is configured to maintain an averaged channel estimate.

18. The apparatus of claim 17, wherein said time synchronizer is configured to calculate an averaged first arriving path ($FAP_{avg}$) and an averaged last arriving path ($LAP_{avg}$) from the averaged channel estimate.

19. The apparatus of claim 18, wherein said time synchronizer is configured to calculate the timing offset based on at least one of the $FAP_{inst}$, the $LAP_{inst}$, the $FAP_{avg}$, and the $LAP_{avg}$.

20. The apparatus of claim 19, wherein said time synchronizer is configured to calculate a FAP and a LAP according to FAP=min($FAP_{inst}$, $FAP_{avg}$) and LAP=max($LAP_{inst}$, $LAP_{avg}$).

21. The apparatus of claim 20, wherein said time synchronizer is configured to calculate a $D_{mid}$ parameter according to $D_{mid}$=(FAP+LAP)/2.

22. The apparatus of claim 21, wherein said time synchronizer is configured to calculate the timing offset based on a desired mid point (Dmid) according to offset=$D_{mid}$−Dmid.

23. The apparatus of claim 21, wherein said time synchronizer is configured to calculate the timing offset based on a Backoff parameter according to offset=FAP−Backoff.

24. The apparatus of claim 13, wherein the length of the channel estimate is determined from a number of pilot observations of the plurality of modulated sub-carriers in the TDM transitional pilot symbol.

25. An apparatus for time tracking synchronization in an orthogonal frequency-division multiplex (OFDM) system, the apparatus comprising:

means for receiving, by a mobile device, at least one time-division multiplexed (TDM) transitional pilot symbol comprising a plurality of modulated sub-carriers that provide a channel estimate having a length that is equal to a duration of an FFT used for data transmission, wherein the at least one TDM transitional pilot symbol provides the channel estimate having the length equal to the duration of the FFT used for data when all sub-carriers of the at least one TDM transitional pilot symbol are modulated as pilots, and wherein the at least one TDM transitional pilot symbol is positioned within a superframe at a boundary between wide area data and local area data;

means for determining an instantaneous channel estimate from the plurality of modulated sub-carriers included in the at least one TDM transitional pilot symbol; and means for calculating a timing offset based on the instantaneous channel estimate.

26. The apparatus of claim 25, wherein the boundary corresponds to a boundary of a data partition.

27. The apparatus of claim 25, wherein the at least one TDM transitional pilot symbol comprises at least one of one or more wide area transitional pilot symbol (WTPS) and one or more local area transitional pilot symbol (LTPS).

28. The apparatus of claim 25, wherein said means for calculating comprises means for calculating an instantaneous first arriving path ($FAP_{inst}$) and an instantaneous last arriving path ($LAP_{inst}$) from the instantaneous channel estimate.

29. The apparatus of claim 28, wherein said means for determining comprises means for maintaining an averaged channel estimate.

30. The apparatus of claim 29, wherein said means for calculating comprises means for calculating an averaged first arriving path ($FAP_{avg}$) and an averaged last arriving path ($LAP_{avg}$) from the averaged channel estimate.

31. The apparatus of claim 30, wherein said means for calculating comprises means for calculating the timing offset based on at least one of the $FAP_{inst}$, the $LAP_{inst}$, the $FAP_{avg}$, and the $LAP_{avg}$.

32. The apparatus of claim 31, wherein said means for calculating comprises means for calculating a FAP and a LAP according to FAP=min($FAP_{inst}$, $FAP_{avg}$) and LAP=max($LAP_{inst}$, $LAP_{avg}$).

33. The apparatus of claim 32, wherein said means for calculating comprises means for calculating a $D_{mid}$ parameter according to $D_{mid}$=(FAP+LAP)/2.

34. The apparatus of claim 33, wherein said means for calculating comprises means for calculating the timing offset based on a desired mid point (Dmid) according to offset=$D_{mid}$−Dmid.

35. The apparatus of claim 33, wherein said means for calculating comprises means for calculating the timing offset based on a Backoff parameter according to offset=FAP−Backoff.

36. The apparatus of claim 25, wherein the length of the channel estimate is determined from a number of pilot observations of the plurality of modulated sub-carriers in the TDM transitional pilot symbol.

37. A computer program product for time tracking synchronization in an orthogonal frequency-division multiplex (OFDM) system, comprising:
a non-transitory computer-readable medium comprising:
a first set of codes for causing a mobile device to receive at least one time-division multiplexed (TDM) transitional pilot symbol comprising a plurality of modulated sub-carriers that provide a channel estimate having a length that is equal to a duration of an FFT used for data transmission, wherein the at least one TDM transitional pilot symbol provides the channel estimate having the length equal to the duration of the FFT used for data when all sub-carriers of the at least one TDM transitional pilot symbol are modulated as pilots, and wherein the at least one TDM transitional pilot symbol is positioned within a superframe at a boundary between wide area data and local area data;
a second set of codes for causing the mobile device to determine an instantaneous channel estimate from the plurality of modulated sub-carriers included in the at least one TDM transitional pilot symbol; and
a third set of codes for causing the mobile device to calculate a timing offset based on the instantaneous channel estimate.

38. The computer program product of claim 37, wherein the boundary corresponds to a boundary of a data partition.

39. The computer program product of claim 37, wherein the at least one TDM transitional pilot symbol comprises at least one of one or more wide area transitional pilot symbol (WTPS) and one or more local area transitional pilot symbol (LTPS).

40. The computer program product of claim 37, wherein said third set of codes is configured to cause the mobile device to calculate an instantaneous first arriving path ($FAP_{inst}$) and an instantaneous last arriving path ($LAP_{inst}$) from the instantaneous channel estimate.

41. The computer program product of claim 40, wherein said second set of codes is configured to cause the mobile device to maintain an averaged channel estimate.

42. The computer program product of claim 41, wherein said third set of codes is configured to cause the mobile device to calculate an averaged first arriving path ($FAP_{avg}$) and an averaged last arriving path ($LAP_{avg}$) from the averaged channel estimate.

43. The computer program product of claim 42, wherein said third set of codes is configured to cause the mobile device to calculate the timing offset based on at least one of the $FAP_{inst}$, the $LAP_{inst}$, the $FAP_{avg}$, and the $LAP_{avg}$.

44. The computer program product of claim 43, wherein said third set of codes is configured to cause the mobile device to calculate a FAP and a LAP according to FAP=min($FAP_{inst}$, $FAP_{avg}$) and LAP=max($LAP_{inst}$, $LAP_{avg}$).

45. The computer program product of claim 44, wherein said third set of codes is configured to cause the mobile device to calculate a $D_{mid}$ parameter according to $D_{mid}$=(FAP+LAP)/2.

46. The computer program product of claim 45, wherein said third set of codes is configured to cause the mobile device to calculate the timing offset based on a desired mid point (Dmid) parameter according to offset=$D_{mid}$−Dmid.

47. The computer program product of claim 45, wherein said third set of codes is configured to cause the mobile device to calculate the timing offset based on a Backoff parameter according to offset=FAP−Backoff.

48. The computer program product of claim 37, wherein the length of the channel estimate is determined from a number of pilot observations of the plurality of modulated sub-carriers in the TDM transitional pilot symbol.

49. At least one processor configured to perform operations for time tracking synchronization in an orthogonal frequency-division multiplex (OFDM) system, the at least one processor comprising:
a first module for receiving, at a mobile device, at least one time-division multiplexed (TDM) transitional pilot symbol comprising a plurality of modulated sub-carriers that provide a channel estimate having a length that is equal to a duration of an FFT used for data transmission, wherein the at least one TDM transitional pilot symbol provides the channel estimate having the length equal to the duration of the FFT used for data when all sub-carriers of the at least one TDM transitional pilot symbol are modulated as pilots, and wherein the at least one TDM transitional pilot symbol is positioned within a superframe at a boundary between wide area data and local area data;
a second module for determining an instantaneous channel estimate from the plurality of modulated sub-carriers included in the at least one TDM transitional pilot symbol; and
a third module for calculating a timing offset based on the instantaneous channel estimate.

50. The at least one processor of claim 49, wherein the boundary corresponds to a boundary of a data partition.

51. The at least one processor of claim 49, wherein the at least one TDM transitional pilot symbol comprises at least one of one or more wide area transitional pilot symbol (WTPS) and one or more local area transitional pilot symbol (LTPS).

52. The at least one processor of claim 49, wherein said third module is configured to calculate an instantaneous first arriving path ($FAP_{inst}$) and an instantaneous last arriving path ($LAP_{inst}$) from the instantaneous channel estimate.

53. The at least one processor of claim 52, wherein said second module is configured to maintain an averaged channel estimate.

54. The at least one processor of claim 53, wherein said third module is configured to calculate an averaged first arriving path ($FAP_{avg}$) and an averaged last arriving path ($LAP_{avg}$) from the averaged channel estimate.

55. The at least one processor of claim 54, wherein said third module is configured to calculate the timing offset based on at least one of the $FAP_{inst}$, the $LAP_{inst}$, the $FAP_{avg}$, and the $LAP_{avg}$.

56. The at least one processor of claim 55, wherein said third module is configured to calculate a FAP and a LAP according to FAP=min($FAP_{inst}$, $FAP_{avg}$) and LAP=max($LAP_{inst}$, $LAP_{avg}$).

57. The at least one processor of claim 56, wherein said third module is configured to calculate a $D_{mid}$ parameter according to $D_{mid}$=(FAP+LAP)/2.

58. The at least one processor of claim 57, wherein said third module is configured to calculate the timing offset based on a desired mid point (Dmid) according to offset=$D_{mid}$−Dmid.

59. The at least one processor of claim 57, wherein said third module is configured to calculate the timing offset based on a Backoff parameter according to offset=FAP−Backoff.

60. The at least one processor of claim 49, wherein the length of the channel estimate is determined from a number of pilot observations of the plurality of modulated sub-carriers in the TDM transitional pilot symbol.

* * * * *